United States Patent
Rowley

(10) Patent No.: US 10,907,586 B2
(45) Date of Patent: Feb. 2, 2021

(54) FUEL VAPORIZER FOR FUEL INJECTED ENGINES AND UTILITY APPLICATIONS

(71) Applicant: Diesel Solutions, LLC, Wilmington, DE (US)

(72) Inventor: Gerald William Rowley, Delray Beach, FL (US)

(73) Assignee: Diesel Solutions, LLC, Wilmington, DE (US)

( * ) Notice: Subject to any disclaimer, the term of this patent is extended or adjusted under 35 U.S.C. 154(b) by 258 days.

(21) Appl. No.: 15/923,524

(22) Filed: Mar. 16, 2018

(65) Prior Publication Data

US 2018/0266370 A1    Sep. 20, 2018

Related U.S. Application Data

(60) Provisional application No. 62/601,311, filed on Mar. 17, 2017.

(51) Int. Cl.
*F02M 31/18* (2006.01)
*F23D 11/34* (2006.01)
*F23D 11/44* (2006.01)

(52) U.S. Cl.
CPC ......... *F02M 31/186* (2013.01); *F23D 11/345* (2013.01); *F23D 11/44* (2013.01); *Y02T 10/12* (2013.01)

(58) Field of Classification Search
CPC ... Y02T 10/126; F02M 31/186; F23D 11/345; F23D 11/44
See application file for complete search history.

(56) References Cited

U.S. PATENT DOCUMENTS

| | | | | |
|---|---|---|---|---|
| 4,401,089 A * | 8/1983 | Csaszar | ............... | F02M 27/08 |
| | | | | 123/536 |
| 4,483,307 A * | 11/1984 | Gilmor | ............... | F02M 53/02 |
| | | | | 123/558 |
| 5,179,923 A * | 1/1993 | Tsurutani | ............ | F02D 41/064 |
| | | | | 123/179.18 |
| 6,578,532 B1 * | 6/2003 | Rowley | ............... | F02M 25/035 |
| | | | | 123/25 R |
| 9,334,832 B2 * | 5/2016 | Jones | ................. | F02M 31/186 |
| 10,648,430 B2 * | 5/2020 | Jenkins | .............. | F02M 31/18 |
| 2014/0103139 A1 * | 4/2014 | Chang | ................. | F23D 11/44 |
| | | | | 239/137 |

* cited by examiner

*Primary Examiner* — Stephen Hobson
(74) *Attorney, Agent, or Firm* — Bachman & LaPointe, P.C.

(57) ABSTRACT

A fuel vaporizer comprises a primary vaporization chamber comprising a heating chamber fluidly coupled to a fuel tank. The heating chamber is configured to receive a liquid fuel from the fuel tank and vaporize the liquid fuel into a fuel vapor and discharge the fuel vapor to an intake line of a utility application. A heating source is thermally coupled to the heating chamber. The heating source is configured to heat the liquid fuel to produce the fuel vapor. An air supply is fluidly coupled to the heating chamber, the air supply is configured to inject air bubbles into the liquid fuel. A secondary vaporization chamber is fluidly coupled to the intake line, at least one ultrasonic transducer is coupled to the secondary vaporization chamber and configured to vaporize the liquid fuel in communication with the secondary vaporization chamber.

20 Claims, 3 Drawing Sheets

FUEL VAPORIZER FOR FUEL INJECTED ENGINES AND UTILITY APPLICATIONS

CROSS REFERENCE APPLICATIONS

This application claims priority to U.S. Provisional Application No. 62/601,311 filed Mar. 17, 2017.

BACKGROUND

The present invention relates to vaporizing fuel such as diesel, gasoline, alcohol, kerosene, biofuels, bunker oil, or ethanol before introducing fuel vapors into a utility application. The utility application can include updraft intakes and downdraft intakes on internal combustion engines but not limited to these applications. Other applications could include furnaces, stoves, burners, lamps, boilers, Particulate Diesel Filter regeneration systems, plasma devices, and plasma retort systems that require injection of gaseous fuels.

U.S. Pat. No. 6,578,532 (2003) to Rowley discloses a fuel vaporization system for carburetor type gasoline engines. A fuel vaporization chamber is in fluid communication with the fuel tank. The fuel vaporization chamber is in thermal contact with the engine exhaust. The fuel vapors are sent to a molecule mixture box where water vapor is added. A fuel blower from the molecule mixture box sends the vapor mixture to the intake manifold. Fuel efficiency is increased.

What is needed is a fuel vaporization system tailored to meet the vaporous delivery of vaporized liquid fuels required by utility engines and utility applications. Earlier vaporization systems used ultrasonic transducers placed inside liquid fuel. This type of system limited the useful life of the ultrasonic transducer being in direct contact with various types of liquid fuels. The solvency properties of liquid fuels harmfully acted on the inner workings of the ultrasonic transducer shorting the useful life of the transducer. What is needed is a fuel vaporization system using ultrasonic transducers that are not in direct contact with the liquid fuels. Placement of the liquid fuels in a secondary container and using the setup of a standing wave from the ultrasonic transducer in a non-harsh environment in a primary container in such a way as to vaporize the liquid fuel in the secondary container. What is needed is a vaporizing system with the correct controls to produce a steady, dense, and continuous fog of vaporized fuels for end user requirements and applications. End user Utility Applications include updraft and downdraft vaporous fuel fed internal combustion engines, gaseous fuel fed engines, and vaporized fuel requirements of unique utility applications. Other Utility Applications include burners, torches, stoves, flame throwers, furnaces, boilers, DPF regeneration units, lamps, heaters, and plasma retort devices that require a vaporized fuel source at intake or pickup site. The list of Utility Applications is not limited to the above list.

SUMMARY

In accordance with the present disclosure, there is provided a fuel vaporizer comprises a primary vaporization chamber comprising a heating chamber fluidly coupled to a fuel tank. The heating chamber is configured to receive a liquid fuel from the fuel tank and vaporize the liquid fuel into a fuel vapor and discharge the fuel vapor to an intake line of a utility application. A heating source is thermally coupled to the heating chamber. The heating source is configured to heat the liquid fuel to produce the fuel vapor. An air supply is fluidly coupled to the heating chamber, the air supply is configured to inject air bubbles into the liquid fuel. A secondary vaporization chamber is fluidly coupled to the intake line, at least one ultrasonic transducer is coupled to the secondary vaporization chamber and configured to vaporize the liquid fuel in communication with the secondary vaporization chamber.

In another and alternative embodiment, the fuel vaporizer further comprises a float located in the heating chamber, the float is coupled to a needle valve configured to control the liquid fuel flow into the heating chamber responsive to a liquid fuel level within the heating chamber.

In another and alternative embodiment, the float is coupled to a threaded rod and configured adjustable along the threaded rod responsive to an adjustment of an adjustment nut along the threaded rod, wherein the adjustment can control the liquid fuel flow into the heating chamber.

In another and alternative embodiment, the float comprises at least one float.

In another and alternative embodiment, the air supply comprises an adjustable spray tube fluidly coupled to an air pump, the adjustable spray tube is located within the heating chamber and configured to be in contact with the liquid fuel.

In another and alternative embodiment, the fuel vaporizer further comprises a first dissector plate located within the heating chamber and in fluid communication with the adjustable spray tube, the first dissector plate is configured to reduce the size of the air bubbles entering into the liquid fuel.

In another and alternative embodiment, the air pump is fluidly coupled to an adjustable nozzle head located within the secondary vaporization chamber, the adjustable nozzle head being configured to contact the liquid fuel and create air bubbles within the liquid fuel.

In another and alternative embodiment, the fuel vaporizer further comprises a second dissector plate located within the secondary vaporization chamber above the (at least one) ultrasonic transducer and in fluid communication with the adjustable nozzle, the second dissector plate is configured to reduce the size of the air bubbles entering into the liquid fuel.

In another and alternative embodiment, the heating source comprises at least one of a flame produced by a gaseous fuel thermally coupled to the heating chamber, a heated housing surrounding the heating chamber, an electrical platform thermally coupled to the heating chamber and a conductive heat sink thermally coupled to the heating chamber.

In another and alternative embodiment, the fuel vaporizer further comprises a secondary vessel coupled to the secondary vaporization chamber, the secondary vessel is configured to contain the liquid fuel, wherein the liquid fuel is segregated from contacting the at least one ultrasonic transducer coupled to the secondary vaporization chamber.

In another and alternative embodiment, the fuel vaporizer further comprises an inert liquid contacting the at least one ultrasonic transducer coupled to the secondary vaporization chamber, wherein the inert liquid is compatible with the at least one ultrasonic transducer.

In another and alternative embodiment, the secondary vessel is fluidly coupled to the inert liquid.

In another and alternative embodiment, the air supply is fluidly coupled to the secondary vaporization chamber.

In another and alternative embodiment, the fuel vaporizer further comprises an explosion proof venting fan fluidly coupled to at least one of the secondary vaporization chamber and the secondary vessel, the explosion proof venting fan is configured to vent the fuel vapor to the intake line.

In accordance with the present disclosure, there is provided a process for vaporizing a liquid fuel comprising dispensing a liquid fuel into a heating chamber of a primary vaporization chamber comprising the heating chamber, the heating chamber being fluidly coupled to a fuel tank; dispensing the liquid fuel into a secondary vaporization chamber fluidly coupled to the fuel tank, the secondary vaporization chamber being coupled to at least one ultrasonic transducer configured to vaporize the liquid fuel in communication with the secondary vaporization chamber; aerating the liquid fuel in the heating chamber and the secondary vaporization chamber with air bubbles; heating the liquid fuel with a heating source thermally coupled to the heating chamber; vaporizing the liquid fuel to produce a fuel vapor; and supplying the fuel vapor to an intake line of a utility application.

In another and alternative embodiment, aerating the liquid fuel in the heating chamber utilizes an adjustable spray tube fluidly coupled to an air pump, the adjustable spray tube is located within the heating chamber and is configured to be in contact with the liquid fuel.

In another and alternative embodiment, the process of aerating further comprises segregating the air bubbles with a first dissector plate located within the heating chamber and in fluid communication with the adjustable spray tube, the first dissector plate configured to reduce a size of the air bubbles entering into the liquid fuel.

In another and alternative embodiment, the process of aerating further comprises segregating the air bubbles with a second dissector plate located within the secondary vaporization chamber and in fluid communication with an adjustable nozzle head located within the secondary vaporization chamber.

In another and alternative embodiment, heating the liquid fuel with a heating source thermally coupled to the heating chamber utilizes at least one of a flame produced by a gaseous fuel thermally coupled to the heating chamber, a heated housing surrounding the heating chamber, an electrical platform thermally coupled to the heating chamber and a conductive heat sink thermally coupled to the heating chamber.

In another and alternative embodiment, supplying the fuel vapor to an intake line of a utility application comprises utilization of an explosion proof venting fan configured to vent the fuel vapor to the intake line.

An aspect of the present invention is to produce vaporized fuels using two types of methodology. These vaporized fuels are specific to utility applications that accept gaseous, vaporized fuels including gas fed internal combustion engines, burners, flame throwers, furnaces, torches, boilers, stoves, DPF (Diesel Particulate Filter) regeneration systems, syngas operations, lamps, heaters, plasma retorts, and other plasma devices. One type of vapor fuel is produced by heating and adding moving air to specific quantities of liquid fuel and continuous metering through a float valve assembly to ensure continuous and properly desired vaporized fuel quality. The second type of vaporized fuel is produced by bringing liquid fuel into contact with the ultra-high frequency sound waves of an ultrasonic transducer (or an array of ultrasonic transducers) and a stream of moving air. This methodology produces a steady supply of vaporized fuel which aids the vapor produced from the first vaporization chamber (Method A). Either stream of vapor can be utilized separately or combined depending on the end-user requirements. FIG. 2 shows another embodiment of the ultrasonic transducer(s) being left inside a primary vessel that holds inert liquids that do not attack the ultrasonic transducer. The liquid fuels that normally attack the ultrasonic transducer(s) are placed inside a secondary vaporization chamber and a resonating standing sound wave is set up from the ultrasonic transducer to vaporize the liquid fuels in the secondary vessel when the secondary vessel is held in a specific degree of alignment with the ultrasonic transducer(s) in the primary vessel.

Another aspect of the present invention is to use/offer several types of heating platforms to change state the liquid fuel to vapor. These platforms allow various temperature ranges to be applied to the various liquid fuels to be vaporized in the apparatus. Liquid fuels types have varying differences in vaporization temperature requirements depending on the type of liquid fuel being used in the apparatus. For example gasoline requires a lower temperature range to vaporize compared to say diesel fuel which requires a much higher temperature range to vaporize. One heating platform is to apply direct open flame to the stainless steel housing (430) of FIG. 1. This open flame can be provided by propane, natural gas, butane, or other gaseous flame. The temperature applied to the stainless steel housing can be raised or lowered by increasing the distance of the flame or decreasing the distance of the flame directed to the stainless steel housing. Another control of the flame temperature is simply adjusting the amount of fuel and air mixture supplying the flame at a fixed distance.

Another platform of heating is transferring heat from heated coolant or exhaust gas that is passed through the heating chamber (431). The heating chamber is in direct contact with the vaporization chamber (430) of FIG. 1. The heated fluid enters one port and exits another port heating both the heating chamber and the vaporization chamber. A third embodiment is applying heat directly to the vaporization chamber (430) via an electrical heating element, resistant heater, inductive heater, or electrical hot plate. Another aspect of the present invention is to provide a thermostatic control to the previously mentioned hot plate or electrical types of heaters. A fourth embodiment (FIG. 4) but not limited to is conductive heat transfer from a very hot surface to the bottom of the vaporization chamber (430) via a heat sink with outstanding heat transfer capabilities.

Another aspect of the present invention is to provide a variable speed and variable pressure air supply to provide increased production of the vapors and provide movement of the vapors to the exiting lines. The air pump adds regulated air bubbles to the liquid fuel in the heating chamber to aid in the vaporization process. The air bubbles pass through several types of features to produce fine desirable bubbles.

Another aspect of the present invention is the adjustable air supply spray bar/tube. The spray bar has an adjustable end that allows more or less bubbles to exit the spray bar. Air bubbles are also controlled by the size and number of orifices drilled into the spray bar. The quality and quantity of the air bubbles are also controlled by the air supply settings and pressure. The desirability of the air bubbles is also controlled by a classification/dissector plate. This plate helps produce the most desirably sized bubbles.

Another aspect of the present invention is the control of the level of the liquid fuel in the vaporization chamber. The liquid fuel can be controlled by raising or lowering the heights of the floats. The heights of the floats are determined by turning an adjustment nut and moving the bottom float up or down on the connecting rod. Also, the liquid fuel level in the vaporization chamber in communication with the ultrasonic transducer can be adjusted by metering.

Another aspect of the present invention is the vaporization chamber holding the floats has built-in guides to keep the floats moving up and down and in a perpendicular direction. The sidewalls in the vaporization chamber act as guides for the floats in addition to the brass guide/seat located in the top cap that operates the opening and closing of the Viton needle valve. As the floats move up and down the fuel level is controlled in the heating chamber. When the float drops liquid fuel is allowed to enter into the heating chamber. When the float rises it stops the flow of liquid fuel into the heating chamber.

Another aspect of the present invention is the position of a diverter plate inside the vaporization chamber that separates the incoming liquid fuel and the outgoing vaporized fuel.

Another aspect of the present invention is the position of a fluid trap outside of the vaporization chamber inside the airline feeding air from the air pump. This fluid trap collects unused liquid fuel that settles in the low section of the air supply line and feeds this fuel to the secondary vaporization chamber via a metering valve. The metering valve regulates the amount of liquid fuel to be vaporized by the ultrasonic transducer.

Another aspect of the present invention is the position of check valves inside the fuel lines to keep the fluids moving smoothly and in the proper direction.

Another aspect of the present invention is the positioning of a secondary vaporization chamber containing liquid fuels in a specific geometric degree of alignment with the primary vessel holding the ultrasonic transducer(s) in an inert liquid. This specific degree of alignment allows a resonating standing ultrasonic high-frequency sound wave to be set up in the secondary vaporization chamber. These high frequency sound waves vaporize the liquid fuels in the secondary vessel and not the liquids in the primary vessel where the ultrasonic transducer is located.

Other aspects of this invention will appear from the following description and appended claims, reference being made to the accompanying drawings.

It is to be understood that the invention is not limited in its application to the details of the particular arrangements shown, since the invention is capable of other embodiments. Also the terminology used herein is for the purpose of description and not of limitation

DETAILED DESCRIPTION

Figure 1:
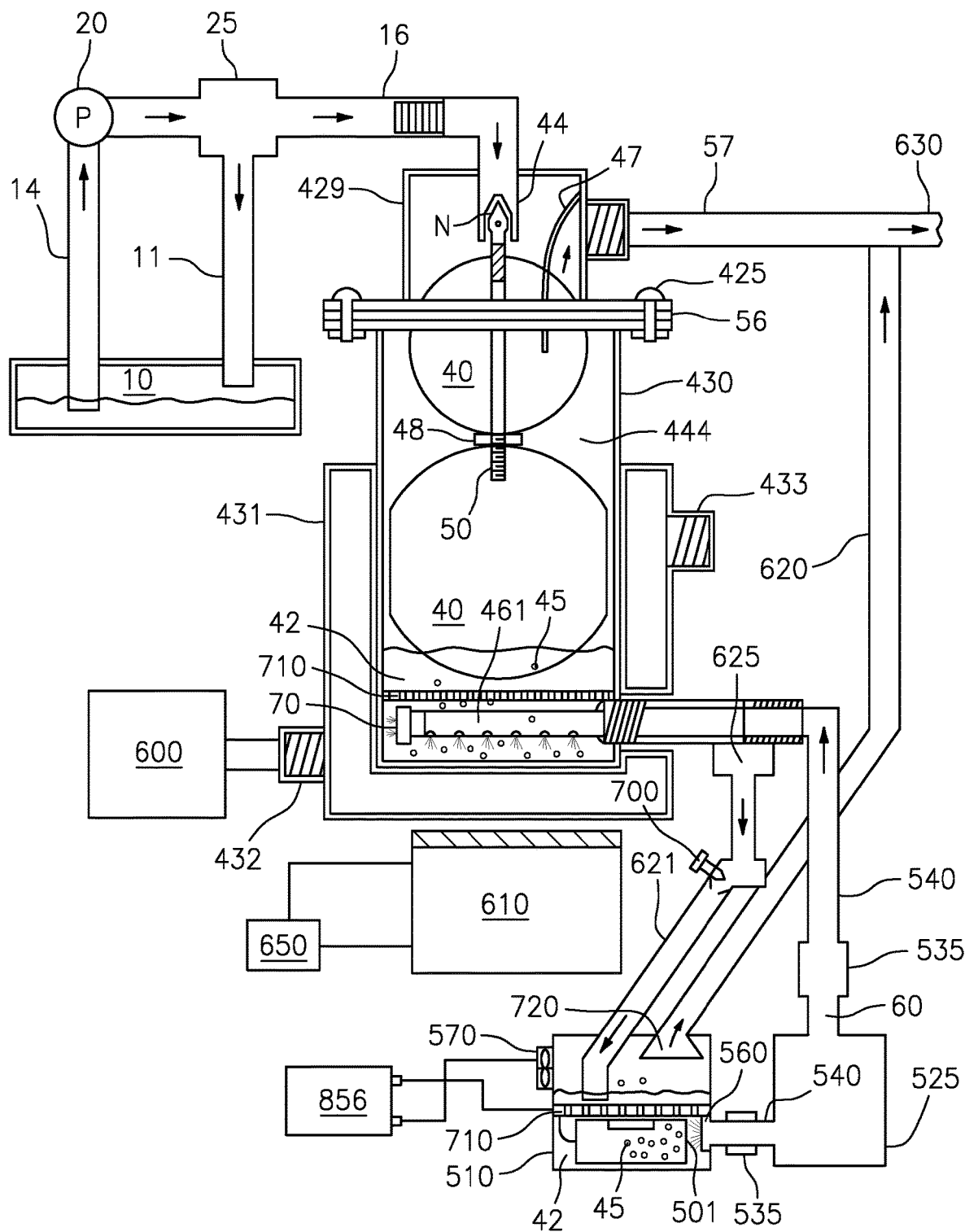
FIG. 1 is a schematic drawing of the various vapor embodiments including both hot and cool vaporization processes of liquid fuels.

Referring first to FIG. 1 a fuel pump 20 pumps liquid fuel from the fuel tank 10 through a circuit of tubing. Fuel passes through the pickup tubing 14 leaving the tank and moves to a diverter valve 25. Fuel moves past the diverter valve 25 and returns to the tank 10 via the return line 11. Liquid Fuel is allowed to flow through the by-pass branch 16 of the diverter valve 25 when the needle valve N falls lower in the Brass Seat 44. The fuel level 42 inside the heating chamber 444 of the primary vaporization chamber assembly 430 drops when the liquid fuel is vaporized and sent out the exit tube 57. When the fuel level 42 in the primary vaporization chamber assembly 430 drops to a preset level the floats 40 drop allowing the needle valve N to open in the brass seat 44. When the seal is opened in the brass seat 44 more liquid fuel is allowed to flow from the by-pass branch 16 and into the heating chamber 444. This cycling procedure is continued over and over again allowing for a continuous duty vaporization process.

The floats 40 are completely adjustable via an adjustment nut 48 on a threaded rod 50. The bottom float 40 is also adjustable on the threaded rod 50. Raising the floats 40 allows more fuel to enter the heating chamber 444. Lowering the floats 40 allows less fuel to enter the heating chamber 444. The floats are secured and guided in a perpendicular fashion by two touch points. The interior walls of the heating chamber 444 serve as guide and allow up and down movement for the floats 40. The second guide is served by the Brass Seat 44. The float assembly holding the Viton needle N slides up and down in the Brass Seat 44 and serves as a guide to hold the top of the float assembly 40.

The fuel vaporization process is aided by aerating the liquid fuel 42 that is, pushing air bubbles 45 through the liquid fuel 42 located in the bottom of the heating chamber 444. The air bubbles are created by passing an air supply 60 through an adjustable spray bar/tube 461 via an air supply 525. The air supply 60 is created by an electric air pump 525 and travels through a check valve 535 and through the supply line 540 to the adjustable spray bar/tube 461 inside the heating chamber 444. The electric air pump 525 has an adjustable air supply and adjustable air pressure features.

The adjustable spray bar/tube 461 has an adjustable end which allows more or less bubbles to be released depending on a clockwise or counter clockwise movement of the threaded end nozzle 70. In addition the adjustable spray bar/tube 461 has orifices drilled into the length of the bar/tube 461. These orifices can vary in size and number depending on the size and pattern of the bubble release requirement.

A classification/dissector plate 710 is located above the spray bar/tube 461. The classification/dissector plate 710 main function is to produce smaller bubbles from large bubbles. Larger bubbles are stopped and popped and only small bubbles are allowed to rise above the classification/dissector plate 710. The most notable material for this classification/dissector plate 710 is perforated stainless steel sheeting. But other materials may be found to be suitable. Small bubbles are more desirable because they create a denser and more desirable vapor.

The secondary vaporization chamber 510 also has a classification/dissector plate 710 located above the ultrasonic transducer 501. The most notable material for this classification/dissector plate 710 is perforated nylon sheeting. But other materials may be found to be suitable.

The first embodiment of heating the vaporization chamber includes the heating source 600. The heating source 600 can include an open flame provided by a propane flame or other gaseous fuel such as butane, natural gas, etc. The flame can be directed to the bottom or side of the vaporization chamber 430 which radiates heat to the fuel located in the heating chamber 444. The temperature of the flame can vary depending on the type of gaseous fuel being used, the amount of fuel and air supplied to the flame, and the distance of the flame from the side or bottom of the vaporization chamber 430. The temperature requirements depend on the type of fuel being vaporized.

The second embodiment of heating the vaporization chamber 430 includes passing the heat source 600 through a casing/housing 431 surrounding the vaporization chamber 430. The heated fluid would enter the overall casing 431 through the inlet opening 432 and circulate through the casing/housing 431 and exit the outlet pipe. This embodiment allows a more uniform heating of the vaporization chamber 430. The heating fluids can include but not be limited to engine coolant, engine oil, engine exhaust, EGR gas, gaseous flames (propane, natural gas, butane, etc.), and transmission fluid. These fluids can remain in a circular pattern via a pump or a straight in and straight out procession transferring the heat to the casing/housing 431 and in turn transferring the heat to the heating chamber 444.

A third embodiment of heating the vaporization chamber 430 includes an electrical platform such as hot plate, heating element, resistance heater, or induction heater 610 to apply heat directly to the bottom of the heating chamber 444. The electrical platform 610 is operated through a thermostatically controlled relay 650. The thermostat 650 on the electrical platform is set to the desired temperature and the heating device 610 cycles on and off to keep the heat in the desired range. This heating device is operated by a separate power supply not shown in the drawing.

Figure 4:
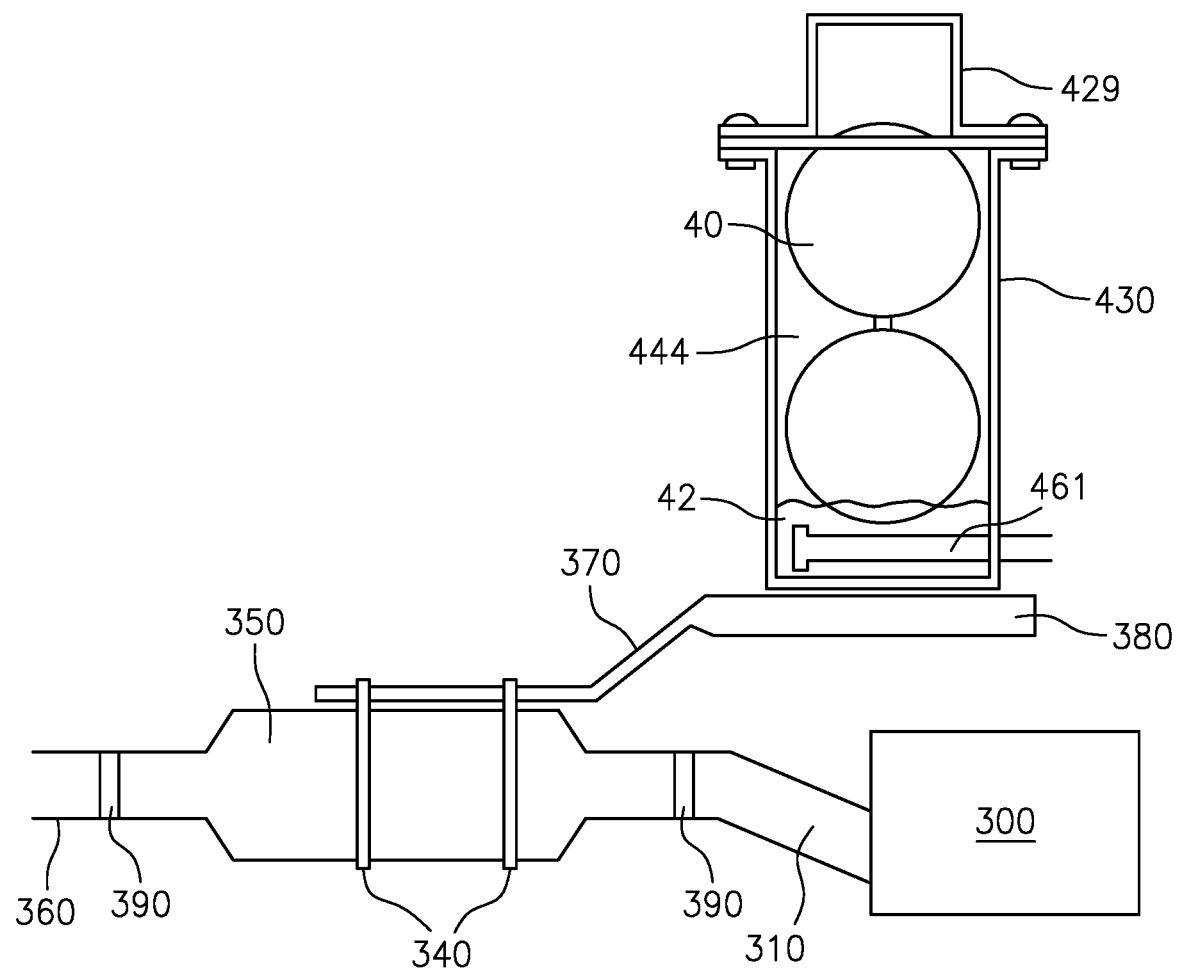
FIG. 4 is a schematic drawing of the Fourth Embodiment of heat transfer to the bottom of the primary vaporization chamber.

A fourth embodiment of heating the vaporization chamber 430 includes heat transference from a conductive heat sink 380. This embodiment is shown in FIG. 4. Heat is transferred from a very high temperature source 350 using a conductive heat sink 380. The very high temperature heat source 350 can be a turbo housing, catalytic converter, Diesel Particulate Filter, exhaust manifold, or exhaust tubing 310 connected to an internal combustion engine 300. The heat sink 380 is a solid piece of metal preferably copper that conducts the heat from a very hot surface 350 and deposits it to another surface the bottom of the vaporization chamber 430. The heat sink 380 can be made from other materials other than copper but copper has a very high thermal transfer coefficient and is very malleable making it an ideal material. The heat loss increases as the distance from the heat source increases. An insulating cover over the heat sink 380 could reduce this heat loss. It is desirable to know the desired heat required to vaporize the liquid fuel. Knowing this temperature range one can design the heat sink 380 to deliver the appropriate heat required. The heat sink 380 has a leg 370 that extends to contact the heat source 350. The leg 370 of the heat sink is held in place to the heat source 350 via clamps or straps 340. Heat is created by the internal combustion engine 300 when expelling exhaust gases. These exhaust gases travel out the exhaust manifold through tubing 310, catalytic converter 350, mufflers, Diesel Particular Filters 350, and tail pipe 360. The various sections of the exhaust system are held in place by clamps and straps 390. The heat transfer begins at the source of high temperature 350 and is conducted along the length of the heat sink leg 370 to the larger mass of the heat sink 380. This heat is conducted to the bottom of the primary vaporization chamber 430 via contact with the heat sink 380. The heat is eventually transferred to the liquid fuel 42 where it is vaporized. FIG. 4 does not show all the components of the vaporizing apparatus which are shown in other drawings for the sake of simplicity.

When the heat and air bubbles act on the liquid fuel 42 vaporized fuel is the result. The vaporized fuel rises in the vaporization chamber 430 and passes into the head cap 429.

The head cap 429 is joined to the vaporization chamber 430 via nuts and bolts 425 and sealed by a gasket 56 which can be made from a variety of gasket materials. This gasket connection 56 between the head cap 429 and the main vaporization chamber 430 can be eliminated during manufacturing using a welding technique is so desired. Located in the head cap 429 is a diverter plate 47 which lets the vapors pass through the exit tube 57. The primary vapors join vapors from the secondary vapor exit line 620 and leave to fuel the Utility Applications 630.

The second stage of the dual feed vaporization unit is the secondary vaporization chamber. The complete operational unit is referred to as vaporization chamber. The functioning vapor collection chamber 510 comprises a number of operational features that are attached to the vapor collection chamber 510. The main fuel feed for the secondary vaporization chamber 510 is supplied by excess fuel which gets caught in the trap 625 from the air supply line 540 going into the heating chamber 444 of the primary vaporization chamber 430. The trapped liquid fuel enters the secondary vaporization chamber 510 via the fuel entry line 621. The liquid fuel is metered by a metering valve 700 located in the fuel entry line 621. The liquid fuel 42 covers the surface of an ultrasonic transducer 501 in the bottom the secondary vaporization chamber 510. The ultrasonic transducer 501 is powered by a power supply 856 located outside of the vaporization chamber 510. In addition a small explosion proof fan 570 is mounted on the side wall of vaporization chamber 510 to help move vapors out of the chamber up through the angled exit cap 720 and up through exit tube 620. The small venting explosion proof fan 570 is also powered by the power supply 856.

Air 60 is passed from the dual feed air supply unit 525 and is pushed through the intake line 540 through a check valve 535. Air 60 after leaving the check valve 535 moves into an adjustable nozzle head 560. The bubble size 45 can be changed by turning the nozzle head 560 clockwise or counter clockwise to make smaller or larger bubbles as desired. Smaller bubble size 45 is more desirable because it produces a dense vapor. When the ultrasonic transducer 501 produces vapors from the liquid fuel 42 larger bubbles are created. The larger bubbles come in contact with the classification/dissector plate 710 and get reduced to smaller bubbles 45. This process aids in denser vaporization and allows the liquid fuel to be vaporized more completely. The vaporized fuel moves out of the secondary vaporization chamber 510 through the angled exit cap 720 and out through the vapor exit line 620. The vaporized fuel joins the primary vaporized vapor line 57. The vapor then travels to the intake line 630 of the gaseous fed internal combustion engines or intake line 630 of any other suitable Utility Application. Utility Applications include but are not limited to stoves, burners, lamps, flame throwers, plasma retorts, furnace, boilers, heaters, Diesel Particulate Filter regeneration systems, syngas operations, distillation systems, synthetic feedstock operations, and any other systems that require vaporized fuel to operate.

Figure 2:
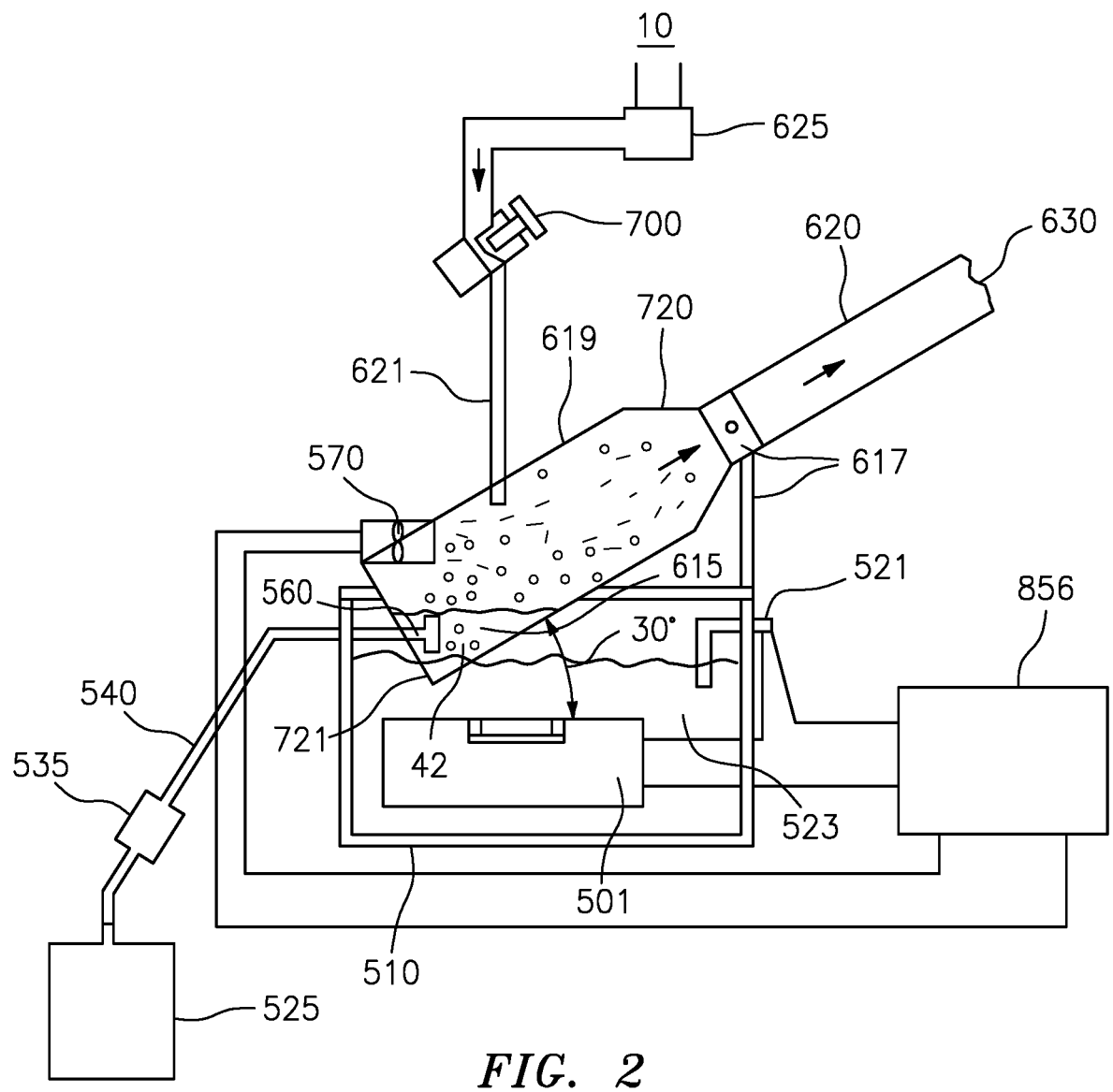
FIG. 2 is a schematic drawing of vaporization embodiment which allows a vaporization process to occur when the ultrasonic transducer(s) is not in direct contact with the liquid fuel in which it is intended to vaporize.

Referring to FIG. 2 shows another embodiment of vaporization chamber 510. This embodiment provides a secondary vessel 619 to house the liquid fuels instead of housing the liquid fuels inside the vaporization chamber 510. The secondary vessel 619 is necessary because some liquid fuels will attack the ultrasonic transducer(s) 501 and shorten its useful life.

Figure 3:
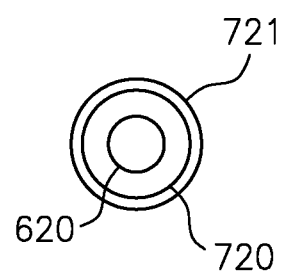
FIG. 3 is a schematic drawing of the End View of vaporization chamber shown in FIG. 2.

The secondary vessel 619 allows a separate housing to hold the attacking liquid fuels. The ultrasonic transducer 501 can be contained in the primary vessel 510 within an inert liquid 523 that is compatible, that is, does not chemically attack the ultrasonic transducer 501. Various inert liquids can be used to contain the ultrasonic transducer 501 including water or silicon oil. Other inert liquids may be found to be suitable. Most of the same parts are included from the first embodiment. Liquid fuel enters the apparatus from a fuel source 10. The liquid fuel moves past the liquid fuel trap 625 and into a line containing the metering valve 700. The metered liquid fuel enters the secondary vessel 619 through an entry fuel line 621 and settles to the bottom of the container. This secondary vessel 619 has a cylindrical shape and a circular end bottom 721. FIG. 3 shows the end view of 619. The end view shows the cross section of the circular end bottom 721, the angled vented exit 720, and the exiting pipe 620.

The secondary vessel 619 sits in direct contact with the fluid 523 surrounding the ultrasonic transducer 501 sitting inside the primary vessel 510. The level of the fluid 523 surrounding the ultrasonic transducer 501 is controlled by a sensor 521 that senses when the fluid 523 is low and allows more fluid 523 to be added to the primary vessel 510 from a reservoir not shown in the drawing. This sensor 521 also acts as a safety switch cutting off the current to the ultrasonic transducer 501 from the power supply 856 if the fluid 523 gets too low in the primary vessel 510. A low fluid 523 level surrounding the ultrasonic transducer 501 could damage or destroy the ultrasonic transducer 501. It is important to note that the secondary vessel 619 must be held in a fixed position by a holding bracket 617. This fixed positioning is calculated to be 30 degrees between the two vectors. The first vector being the horizontal top face of the ultrasonic transducer 501. The second vector is formed from the bottom side of the secondary vessel 619. The angle between the two vectors can vary between 25 degrees to 35 degrees. But the greatest resonating standing high frequency sound wave is created when the angle of the two vectors is closest to 30 degrees. The concave cylindrical shape of the side walls of the secondary vessel 619 also help in directing and focusing the resonating high frequency standing sound wave to the liquid fuel 42 located in the bottom of the portion of the secondary vessel 619. Experiments have shown that by keeping the amount of liquid fuel 42 in the bottom of the secondary vessel 619 to a minimum increases the vaporization process. Experiments have shown that by reducing the distance between the bottom of the secondary vessel 619 and the top of ultrasonic transducer 501 increases the magnitude of the standing sound wave. Experiments with different types of vessel materials including glass, fiberglass, epoxies, resins, and plastics alter the magnitude and direction of the standing high frequency sound wave. Glass was found to be a superior material but reinforced fiberglass was found to be a suitable material. This invention is not limiting the different types of building materials that may be found to be suitable to use. The vapors created in the secondary vessel 619 are propelled upwards and outward through the angled vented exit 720 and eventually the exit pipe 620 by the small explosion proof venting fan 570 mounted towards the rear of secondary vessel 619. The venting fan is powered by a power supply 856.

An air supply 60 is provided by an air pump 525 with controls for air pressure and air quantity. The electric air supply pump 525 is powered by a power supply not shown in the drawing. The air 60 moves through a check valve 535 and forward through in inlet air supply line 540 to the adjustable nozzle 560. The quantities and size of the bubbles 615 produced in the liquid fuel 42 are controlled by the adjustable nozzle 560 and the air flow from the adjustable air supply pump 525. The liquid fuel 42 in the secondary vessel 619 is vaporized via the resonating high-frequency standing sound wave that is emitted from the ultrasonic transducer 501 sitting in the primary vessel 510. The vaporized fuel moves out the exit line 620 to the awaiting intake of the Utility Accessory or Utility Engine 630.

A vaporization unit is physically connected to a stand or a bracket on the utility engine or utility device. The heating attachments make available a heating range of 120 degrees F. to 800 degrees F. The heating chamber connected to the vaporization chamber will operate in the adjustable range of 100 degrees F. to 600 degrees F. In this temperature range with an air supply connected to the heating chamber most liquid fuels will be vaporized. As the liquid fuel vaporizes the float assembly drops, thereby opening a needle valve to feed more raw liquid fuel into the reservoir of the vaporization chamber. The vapors move up to the top cap of the apparatus and move out the exit line. The vapors move from the exit line to the inlet side of an end-user utility engine or the inlet side of an end-user utility application.

Liquid fuel is pumped from a fuel tank and enters a vaporization chamber and is heated in various ways. Some of the fuel that enters the first vaporization chamber is bled off from the bottom of the vaporization chamber to a liquid fuel trap and sent to a secondary chamber which houses an ultrasonic transducer (or plural transducers). This second chamber produces cool vapors which can join the primary vapor stream to feed the utility engines or utility applications. This invention is non-obvious because it reduces fuel consumption 10-25% over liquid fuel applications, reduces exhaust emissions, and aids vapor movement through the use of a variable speed and variable pressure air pump and other controls of vapor production and movement. Another aspect that is non-obvious is the use of a dual chamber, dual feed methodology for producing higher flow rates of vaporized fuels. Another aspect of the invention that is non-obvious is the use of multiple heating sources, the use of multiple controls for liquid fuel supply, the use of multiple controls and features to produce specific air bubble sizes, the use of multiple controls to move vaporized fuel to the intended source, and the use of multiple controls to mix the various vaporized fuel streams. Another aspect of the invention that is non-obvious is the use of secondary vaporization chamber that holds the liquid fuel and does not come into direct contact with the ultrasonic transducer. This is possible by positioning the secondary vaporization chamber at such a specific angle with the ultrasonic transducer in an inert solution that it produces a resonating standing wave in the secondary vaporization chamber. The liquids in the secondary vessel are vaporized and not the liquids in the primary vessel which holds the ultrasonic transducer(s).

Another aspect of the present invention is the reduction of exhaust emissions including NOx because more liquid fuel is allowed to vaporize before entering a combustion chamber of an internal combustion engine or a Utility device or Utility Application.

The exemplary heat transfer is accomplished by conductivity using a heat sink 380. The heat sink 380 transfers the heat from a very high temperature heat source say an exhaust manifold, turbo housing, catalytic converter, exhaust tubing, etc. to the bottom of the primary vaporization chamber 430 where heat moves to vaporize the liquid fuel 42 in the heating chamber 444.

The exemplary processes described herein take place separately but continuously at the same time. The second process feeds off of the first process and is regulated by the first process. Separate controls can be added to the secondary process so it operates independently if necessary. The end result leads to a larger production of vaporized fuel.

The exemplary processes described herein are able to occur by placing a secondary vaporization chamber inside the primary vessel holding the ultrasonic transducer(s) at a specific geometric angle or in close tolerance to the specific geometric angle. This placement allows a resonating standing high-frequency sound wave to be directed to the fluids in the secondary vaporization chamber causing this set of liquid fluids to vaporize instead of the first set of liquids where the ultrasonic transducer is located.

The exemplary embodiments show that the container has circular shape in cross section with a desirable design of 360 degrees. This embodiment is not limiting. Other shapes of the vessel can be rounded, triangular, rectangular, or irregular.

There has been provided a fuel vaporizer. While the fuel vaporizer has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A fuel vaporizer comprising:
   a primary vaporization chamber comprising a heating chamber fluidly coupled to a fuel tank, said heating chamber configured to receive a liquid fuel from said fuel tank and vaporize said liquid fuel into a fuel vapor and discharge said fuel vapor to an intake line of a utility application;
   a heating source thermally coupled to said heating chamber, said heating source configured to heat said liquid fuel to produce said fuel vapor;
   an air supply fluidly coupled to said heating chamber, said air supply configured to inject air bubbles into said liquid fuel; and
   a secondary vaporization chamber fluidly coupled to said intake line, at least one ultrasonic transducer coupled to said secondary vaporization chamber configured to vaporize said liquid fuel in communication with said secondary vaporization chamber.

2. The fuel vaporizer according to claim 1, further comprising a float located in said heating chamber, said float coupled to a needle valve configured to control said liquid fuel flow into said heating chamber responsive to a liquid fuel level within said heating chamber.

3. The fuel vaporizer according to claim 2, wherein said float is coupled to a threaded rod and configured adjustable along said threaded rod responsive to an adjustment of an adjustment nut along said threaded rod, wherein said adjustment can control said liquid fuel flow into said heating chamber.

4. The fuel vaporizer according to claim 2, wherein said float comprises at least one float.

5. The fuel vaporizer according to claim 1, wherein said air supply comprises an adjustable spray tube fluidly coupled to an air pump, said adjustable spray tube located within said heating chamber and configured to be in contact with said liquid fuel.

6. The fuel vaporizer according to claim 5, further comprising a heating chamber dissector plate located within said heating chamber and in fluid communication with said adjustable spray tube, said heating chamber dissector plate configured to reduce a size of said air bubbles entering into said liquid fuel.

7. The fuel vaporizer according to claim 5, wherein said air pump is fluidly coupled to an adjustable nozzle head located within said secondary vaporization chamber, said adjustable nozzle head being configured to contact said liquid fuel and create air bubbles within said liquid fuel.

8. The fuel vaporizer according to claim 7, further comprising a secondary vaporization chamber dissector plate located within said secondary vaporization chamber above said at least one ultrasonic transducer and in fluid communication with said adjustable nozzle, said secondary vaporization chamber dissector plate configured to reduce the size of said air bubbles entering into said liquid fuel.

9. The fuel vaporizer according to claim 1, wherein said heating source comprises at least one of a flame produced by a gaseous fuel thermally coupled to said heating chamber, a heated housing surrounding said heating chamber, an electrical platform thermally coupled to said heating chamber and a conductive heat sink thermally coupled to said heating chamber.

10. The fuel vaporizer according to claim 1, further comprising:
    a secondary vessel coupled to said secondary vaporization chamber, said secondary vessel configured to contain said liquid fuel, wherein said liquid fuel is segregated from contacting said at least one ultrasonic transducer coupled to said secondary vaporization chamber.

11. The fuel vaporizer according to claim 10, further comprising:
    an inert liquid contacting said at least one ultrasonic transducer coupled to said secondary vaporization chamber, wherein said inert liquid is compatible with said at least one ultrasonic transducer.

12. The fuel vaporizer according to claim 11, wherein said secondary vessel is fluidly coupled to said inert liquid.

13. The fuel vaporizer according to claim 10, wherein said air supply is fluidly coupled to said secondary vaporization chamber.

14. The fuel vaporizer according to claim 10, further comprising:
    an explosion proof venting fan fluidly coupled to at least one of said secondary vaporization chamber and said secondary vessel, said explosion proof venting fan configured to vent said fuel vapor to said intake line.

15. A process for vaporizing a liquid fuel comprising:
    dispensing said liquid fuel into a heating chamber of a primary vaporization chamber comprising said heating chamber, said heating chamber being fluidly coupled to a fuel tank;
    dispensing said liquid fuel into a secondary vaporization chamber fluidly coupled to said fuel tank, said secondary vaporization chamber being coupled to at least one ultrasonic transducer configured to vaporize said liquid fuel in communication with said secondary vaporization chamber;
    aerating said liquid fuel in said heating chamber and said secondary vaporization chamber with air bubbles;
    heating said liquid fuel with a heating source thermally coupled to said heating chamber;
    vaporizing said liquid fuel to produce a fuel vapor; and
    supplying said fuel vapor to an intake line of a utility application.

16. The process of claim 15, wherein said aerating said liquid fuel in said heating chamber utilizes an adjustable spray tube fluidly coupled to an air pump, said adjustable spray tube located within said heating chamber and configured to be in contact with said liquid fuel.

17. The process of claim 16, wherein said aerating further comprises:
   segregating said air bubbles with a heating chamber dissector plate located within said heating chamber and in fluid communication with said adjustable spray tube, said heating chamber dissector plate configured to reduce a size of said air bubbles entering into said liquid fuel.

18. The process of claim 15, wherein said aerating further comprises:
   segregating said air bubbles with a secondary vaporization chamber dissector plate located within said secondary vaporization chamber and in fluid communication with an adjustable nozzle head located within said secondary vaporization chamber.

19. The process of claim 15, wherein said heating said liquid fuel with a heating source thermally coupled to said heating chamber utilizes at least one of a flame produced by a gaseous fuel thermally coupled to said heating chamber, a heated housing surrounding said heating chamber, an electrical platform thermally coupled to said heating chamber and a conductive heat sink thermally coupled to said heating chamber.

20. The process of claim 15, wherein supplying said fuel vapor to said intake line of a utility application comprises utilization of an explosion proof venting fan configured to vent said fuel vapor to said intake line.

* * * * *